United States Patent [19]

Fessel

[11] 4,403,301

[45] Sep. 6, 1983

[54] WORD PROCESSOR ADAPTED FOR FILLING IN BLANKS ON PREPRINTED FORMS

[75] Inventor: Rudolf Fessel, Jever, Fed. Rep. of Germany

[73] Assignee: Olympia Werke AG, Wilhelmshaven, Fed. Rep. of Germany

[21] Appl. No.: 164,516

[22] Filed: Jul. 2, 1980

[30] Foreign Application Priority Data

Jul. 2, 1979 [DE] Fed. Rep. of Germany ....... 2926669

[51] Int. Cl.³ .................. G06F 15/20; G06F 15/21
[52] U.S. Cl. .................................. 364/900; 364/406; 400/62; 400/63; 400/279
[58] Field of Search ... 364/200 MS File, 900 MS File, 364/519, 406, 523; 400/61-63, 74, 279

[56] References Cited

U.S. PATENT DOCUMENTS

| | | | |
|---|---|---|---|
| 3,786,429 | 1/1974 | Goldman et al. | 364/900 |
| 3,838,396 | 9/1974 | Martin | 364/900 |
| 3,882,988 | 5/1975 | Sloan et al. | 400/317.1 |
| 4,212,077 | 7/1980 | Vittorelli | 364/900 |
| 4,223,393 | 9/1980 | Abe et al. | 364/900 |
| 4,247,906 | 1/1981 | Corwin et al. | 364/900 |
| 4,264,217 | 4/1981 | De Sieno | 400/63 |
| 4,323,315 | 4/1982 | Demonte et al. | 400/63 |
| 4,330,217 | 5/1982 | Churgovich | 400/64 |
| 4,334,286 | 6/1982 | Kerigan et al. | 364/900 |
| 4,357,680 | 11/1982 | Greek, Jr. et al. | 364/900 |

OTHER PUBLICATIONS

R. A. Kolpek, Text Formatting, IBM Technical Disclosure Bulletin, vol. 16, No. 2, Jul. 1973, pp. 391-393.

Primary Examiner—James D. Thomas
Assistant Examiner—Archie E. Williams
Attorney, Agent, or Firm—Spencer & Kaye

[57] ABSTRACT

A microprogrammed word processor, e.g., a typewriter or accounting machine or billing machine, has both normal and special modes of operation. During the normal mode, as alphanumerics and control characters (e.g., space, tab, line feed) are keyed in, the printing carriage is stationary at a margin. While fed-in characters are being memorized in the normal mode, the alphanumerics are viewable on a display. However, neither printing nor carriage movement takes place until later, when one of several separate print instruction signals are recognized by the computer program. During a special mode, as characters are keyed in, there is still no printing of alphanumerics; but, there is non-printing carriage movement along the line of print, to the particular printpoint associated with each keyboard actuation. Accordingly, as the fed-in characters and associated printpoints are being memorized, their actual physical positions, relative to a record carrier such as a preprinted bill or form, are viewable by the machine operator. During the feed-in step, operators can thus make carriage adjustments so as to effectuate proper alignment, of the later to be printed alphanumerics, on different types of forms. Thereafter, the actual printing of the forms can take place from memory into the proper positions on the forms, with the carriage moving either right-to-left or left-to-right.

7 Claims, 3 Drawing Figures 4,403,301

WORD PROCESSOR ADAPTED FOR FILLING IN BLANKS ON PREPRINTED FORMS

BACKGROUND OF THE INVENTION

The present invention relates to a word processor of the type wherein characters fed in by means of a keyboard, are displayed on a display, stored in a text memory, and printed out from the memory at a later time.

Word processors are often provided with a display on which the characters of at least a section of a line of text can be displayed, e.g., a 12-position line display. In such word processing machines, characters fed into the machine by means of a keyboard are stored in a text memory and are simultaneously displayed on the display device without actuating the printing mechanism and printing out the characters fed in. This provides a means for controlling the fed-in text and for making any required corrections by way of renewed character input. Upon the actuation of a special key, the characters are printed out automatically at the end of a line, or at the occurrence of other special criteria, e.g., actuation of a space key after a word has been fed in.

Such a delayed printout is acceptable for normal text input but poses considerable difficulties to the operator in the filling in of forms and similar preprinted material because the display does not afford him a control regarding the particular location on the record carrier at which the characters which have been fed into the memory are going to be printed.

The determination of whether and when the space available in a column of the form has been used up could possibly be made by counting the characters. The prior art has therefore provided a way to switch from the above-described delayed printout to direct printout so that the characters fed in are immediately printed out on the record carrier. Although this measure now makes it possible to fill in forms without difficulty, the ability to correct, which is inherent in a machine having a display and delayed printout, can then no longer be utilized.

SUMMARY OF THE INVENTION

It is the object of the present invention to provide an opportunity to the operator of a word processor of the above-described type to correct character input before printout for filling in forms and similar preprinted material.

The above object is accomplished according to the present invention by a simple modification of a word processing machine of the type having an input keyboard, a display device for displaying characters fed into the machine via the keyboard, a text memory and a printing mechanism, including a printing carriage which is moveable relative to a record carrier along a line of print, and wherein desired characters are fed into the machine by actuating associated keys of the keyboard, the characters fed in are displayed on the display and stored in a memory together with the associated position and control information for the carriage, and the stored character are printed out on the record medium at a later time. According to the basic concept of the invention, upon actuation of a character key, the carriage is moved relative to the record carrier corresponding to the setting movement associated with the particular character key actuated but without printing the character, and the characters stored in the memory are printed out only upon receipt of a separate instruction signal by reading out the character and position information in the memory and causing the carriage to repeat the stored setting movements under control of the memory.

According to further features of the invention the separate instruction signal may be, for example, a special printout function signal, a carriage tabulation jump signal or a line shift signal. In the case of a carriage tabulation jump signal or a line shift signal, the stored information is read out and printed prior to performance of the tabulation jump or the line shift.

The advantages realized with the present invention are in particular that the characters fed in are displayed on the display and printed out on a record carrier with a display but that the operator nevertheless is fully informed of the location on the record carrier at which the character just fed in will be printed out. This provides an optical control possibility and an opportunity to correct characters before they are printed out. These advantages are realized without any significant additional technical expenditures.

BRIEF DESCRIPTION OF THE PREFERRED EMBODIMENT

DETAILED DESCRIPTION OF THE PREFERRED EMBODIMENT

Figure 1:
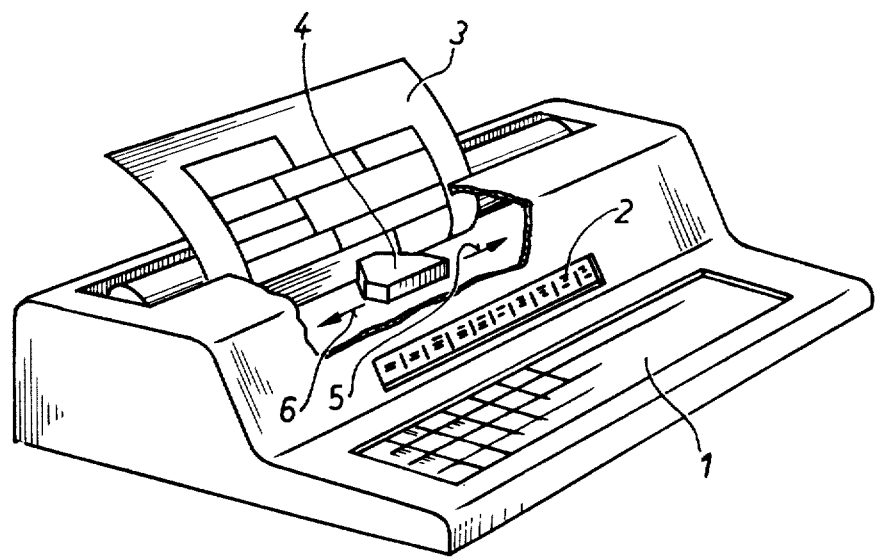
FIG. 1 is a perspective frontal view of a word processor.

The word processor shown in FIG. 1 is a so-called text automat which, in addition to the conventional keyboard 1, includes an alpha-numeric display 2 on which a maximum of ten characters can be displayed in ten columns. A printed form 3, on which text is to be entered in various bordered areas, is held in the machine. In front of the printed form 3, a printing carriage 4 is arranged to be movable in steps in both directions along a line of print. The printing mechanism may be of any desired type, eg., a mosaic printer, a daisy wheel, or a jet printer. The displacement device for the carriage 4 is illustrated by the arrows 5, 6 which indicate the two possible directions of movement or displacement of the carriage 4. The record carrier (printed form 3) can be moved in a known manner, by actuation of an associated key, perpendicularly to the direction of displacement of the printing mechanism.

If a text is fed in to the machine by means of the keyboard 1, the codes associated with the respective associated keys are fed, in succession, into a text memory with an association to the respective positions on the printed form 3 where the text is later to be printed out. Each fed-in character is not only fed into the text memory but is also displayed on the display device 2 with the first character fed in being displayed in the extreme right-hand position and being shifted by one position to the left with each further character fed in so that the visible text will advance progressively from the right to the left. As soon as the ten positions of the display 2 are coupled, every further character fed in causes the character on the left-hand side of the display 2 to no longer be visible due to the shift to the left of the displayed section of text, so that it is always the last ten characters fed in which are visible on the display 2.

Word processing machines which operate in this mode and/or with a display with larger content, e.g. an entire page of text, are well known in the art. Examples are the word processor disclosed in German Offenlegungsschrift No. 2,742,992 and the commercially available TES 401 electronic typewriter, manufactured by Olivetti & Co., Italy.

Figure 2:
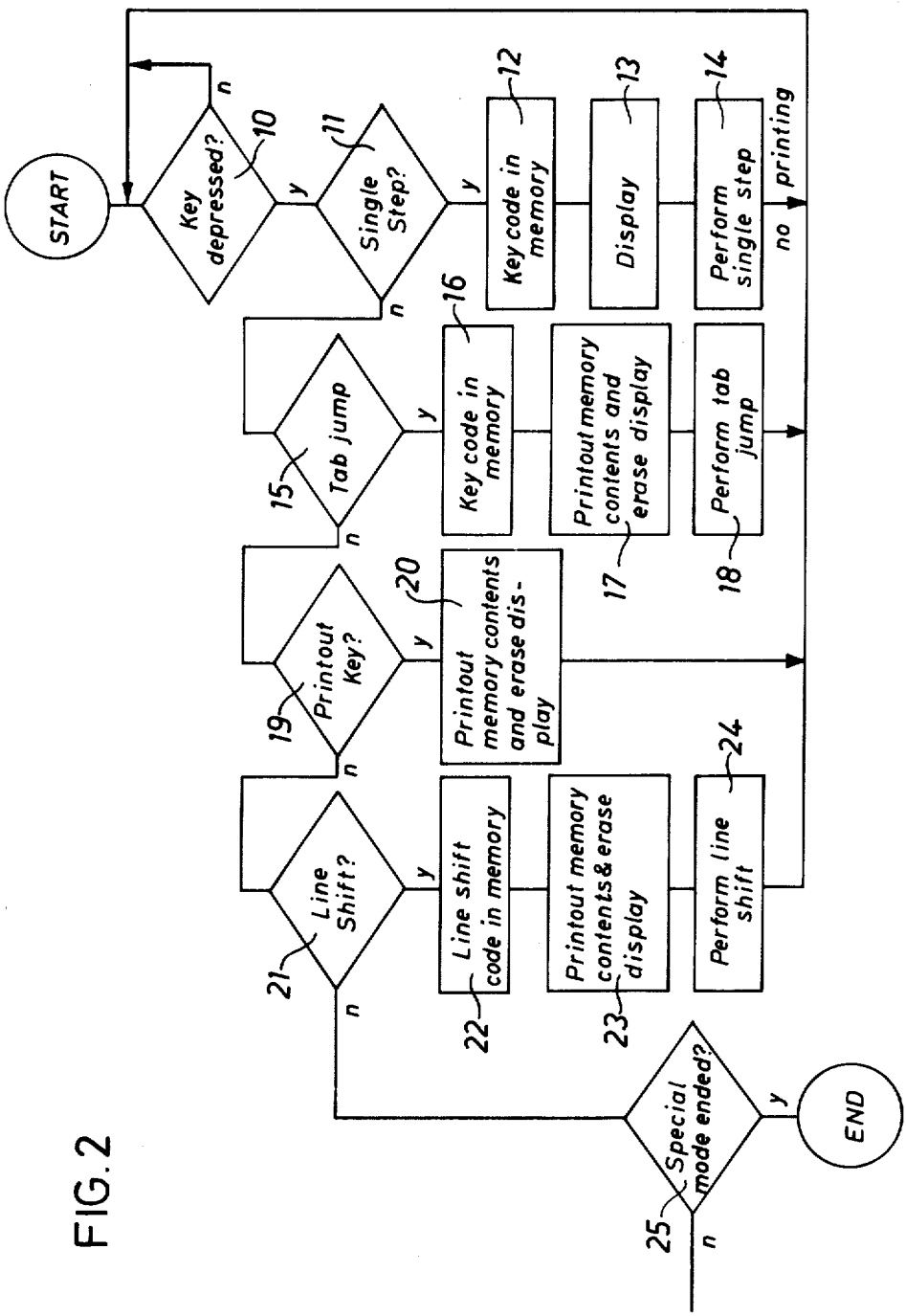
FIG. 2 is a flow diagram of the operation of the word processor according to the invention.

In deviation from this known mode of operation, according to the invention a special mode for filling in forms can be set by actuation of a key, to be described below with the aid of the very simplified flow diagram of FIG. 2. Actuation of the key for the special mode of operation actuates the start of a special program which, as indicated by the block 10, first interrogates the input data to determine the actuation or depression of a key in keyboard 1. This interrogation takes place until actuation is determined. This is followed by an interrogation, in block 11, to determine whether the actuation of the key is connected with an individual step for printing out the character. Normally this will receive an affirmative answer, i.e., a "y" as shown in FIG. 2, with the input of every alpha-numeric character or space step. Then, as indicated by block 12, the code associated with the actuated key together with the association of the position and control information for setting the printing mechanism 4 with respect to the printed form 3 are stored in the text memory for later printout, and the character is question is displayed on the display 2 (block 13).

At the same time, as shown by block 14, the printing mechanism 4 performs the associated individual step without, however, printing the character. The operator can now see from the position of the printing mechanism 4 relative to the printed form 3 where the character displayed on the display 2 will appear on the form 3 when it is later printed out.

When one field of the preprinted form 3 has been filled in this manner, it is possible to instruct the printing mechanism 4 by actuation of a corresponding key, e.g., the tabulation key, to jump to another position adjacent another field of the form 3. In its interrogation routine, the program recognizes, in block 11, that it was not a single step, (and hence produces an "n" signal as shown in FIG. 2), but rather, as shown by block 15, a tabulation jump that was fed in by actuation of the associated key. Consequently, the program causes the corresponding key code to be intermediately stored in the text memory (block 16). It then causes the text stored in the memory to be printed out by the printing mechanism 4 (block 17) before the tabulation jump instruction is followed. For this purpose, the printing mechanism 4 is again set to all positions of the stored text but this time the characters stored for the respective positions are printed in the desired positions or locations on the form 3. The printing mechanism 4 can be positioned during the printout in backward steps from its last position or, after return of the printing mechanism 4 to its initial position, stepwise in the forward direction. Simultaneously with the printing of the text the display is erased. Only after the above-described storage and printout process has been completed will the stored tabulation jump be performed (block 18). A printer wherein the print carriage can print either from right to left or from left to right is disclosed in U.S. Pat. No. 3,882,988, for example.

Since printing mechanisms which operate independently from the keyboard, permit very fast printout speeds, the waiting time until the new position of the carriage 4 has been taken as a result of the tabulation instruction will not be unduly extended, particularly since during the printout process, new characters can continue to be fed into the memory and displayed on the display 2 and only the position indication for the printing mechanism 4 is effected with a delay.

It is also possible to provide a special instruction key for "printout" so that the operator himself can select, by actuation of this key, when printout is to take place, thus avoiding annoying waiting times. In this case the program, as indicated by block 19, recognizes the actuation of the "printout" key causes the memory contents to be printed on the form 3 and the display 2 to be erased (block 20).

When the end of a line is reached, a line shift is either effected automatically, e.g. in a known manner by feeding in a space., a punctuation mark or a hyphen in a margin zone, or by intentionally actuating a line shift e.g. by means of a line shift key. Upon recognizing a line shift instruction (block 21), the program then, as for the "tabulation" instruction, causes the line shift code first to be stored in the memory (block 22) and then the characters still contained in the memory to be printed out, with the display again being erased (block 23). Then only will the line shift instruction be carried out and the printing mechanism returned to its starting position (block 24).

Finally the actuation of a key "end of special mode of operation" will, when elected (block 25) terminate the program and permit the machine to return to its normal mode of operation.

In addition to the functions actuated by the depression of a key, a word processor of course also includes a series of other functions which are in interactive relationship with the apparatus according to the invention and its function control. However, their detailed explanation is not necessary to understand the present invention.

Although in the selected embodiment there is provided a special mode of operation for the nonprinting follow-up of the carriage 4, it would also be conceivable for the machine to operate generally in the manner described above.

Figure 3:
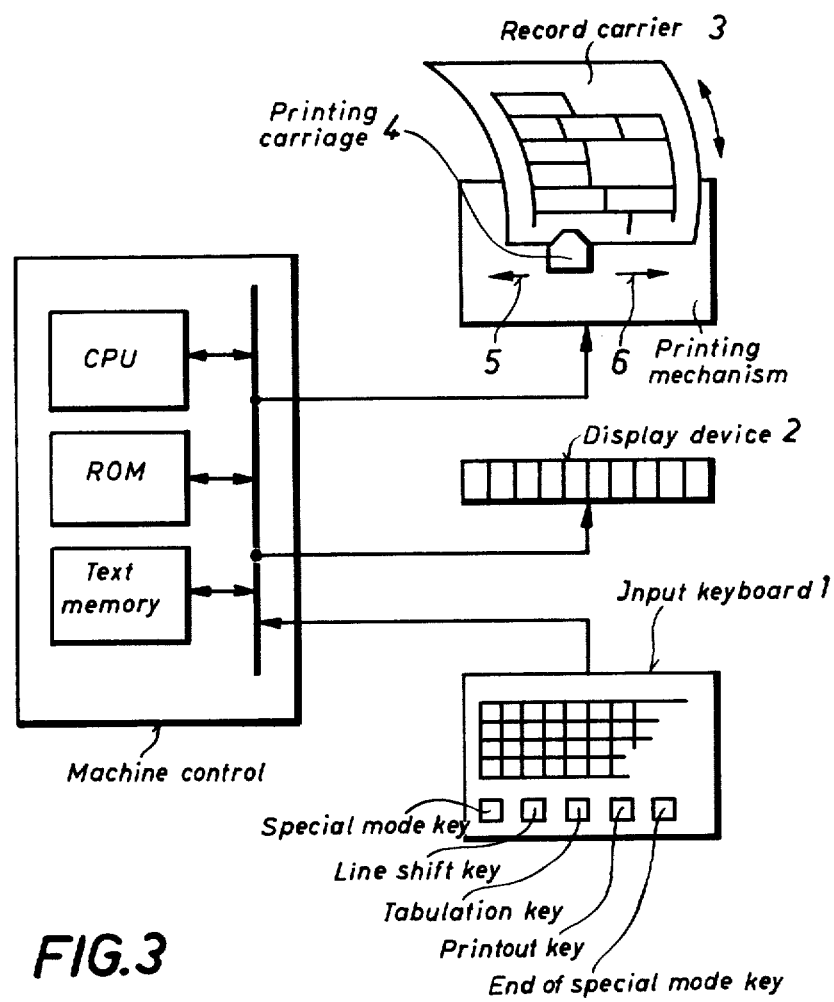
FIG. 3 is a block diagram of the word processor according to the invention.

FIG. 3 shows the block diagram of a word processor with its components which are essential to the understanding of the present invention. A microprogram controlled machine control includes a central processing unit (CPU), a microprogram memory (ROM) and a text memory, which are in communicating connection via a bus. Data and instructions fed in via an input keyboard 1 are processed in a known manner and can be stored in the text memory. Data and instructions to be read out are transmitted to a display device 2 and/or to a printing mechanism, including a printing carriage 4 which is moveable in one of two directions indicated by arrows 5 and 6. A record carrier 3 is moveable perpendicularly to the moving direction of the printing carriage 4.

Five keys are illustrated separately on the keyboard 1 which are of importance for the explanation of the invention. Actuation of the "special mode" key causes the machine control to start the special program as described before. When the special mode is set, actuation of the "line shift" key causes the printing out of the text stored in the text memory prior to the line shift function and actuation of the "tabulation" key causes the printing out of the stored text prior to the tabulation jump function. The "printout" key allows the operator to instruct the machine control that printout of the stored text is to take place and actuation of the "end of special mode" key causes the machine control to terminate the special mode program and to return to the normal mode of operation.

Prior art word processing machines which can be programmed to operate according to the present invention are for example the TES 401 electronic typewriter and the word processor disclosed in German Offenlegungsschrift No. 2,742,992, both mentioned before. The programmer would have to redesign the microprogram contained in the ROM of the known word processor and enter a program routine in accordance with the special program which can be put into action by actuation of the "special mode" key as described above. It could be necessary to provide the keyboards of the prior art word processing machines with some additional keys according to the keys described in connection with FIG. 3 if there are no suitable keys existing.

It is to be understood that the above description of the present invention is susceptible to various modifications, changes and adaptations, and the same are intended to be comprehended within the meaning and range of equivalents of the appended claims.

What is claimed is:

1. In a method of operating a word processing machine, which is of the type having an input keyboard, a display device for displaying characters fed into the machine via the keyboard, a text memory, and a printing mechanism including a printing carriage which is moveable relative to a record carrier along a line of print, said method having a normal mode of operation including the steps of feeding desired characters into the machine by actuating associated keys of the keyboard, displaying the characters fed in via the keyboard on the display, storing the characters fed in via the keyboard and the associated positions and control information for the carriage in the memory but without moving the carriage, and printing out the stored characters on the record carrier at a later time; the improvement comprising:

providing a special mode of operation for the filling out of the fields of a printed form type of record carrier upon actuation of a special mode key on the keyboard; and during said special mode of operation (a) upon actuation of a character key during said step of feeding, moving the carriage from left to right relative to the desired field of the record carrier corresponding to the carriage movement associated with the particular character key actuated but without printing the character in the fields of said printed form;

(b) carrying out said step of printing in the fields of the form with the characters stored in the memory only upon receipt of a separate instruction signal; and (c) said step of printing includes reading out the character and associated position and control information for the carriage stored in the memory, and causing the carriage to repeat the stored carriage movements under control of the memory so as to print, in the fields of said printed form, the stored characters in the associated positions along the line of print occupied by the carriage during said step of feeding, whereby the position of characters relative to the fields of the printed form may be directly observed during feeding in of the characters.

2. The method of claim 1 wherein said separate instruction signal is produced by actuation of a special function signal; and wherein said step of printing out occurs automatically upon actuation of said special function signal.

3. The method of claim 1 or 2 wherein said separate instruction signal is produced by actuation of a special printout key; and said step of printing out occurs automatically upon actuation of the special printout key.

4. The method of claim 1 wherein said separate instruction signal is a signal corresponding to a carriage tabulation jump; and wherein said method further comprises: actuating a signal for causing a tabulation jump of the carriage; storing the signal corresponding to a tabulation jump in the memory; automatically performing said step of printing upon receipt of said signal corresponding to a tabulation jump; and thereafter moving the carriage to perform the tabulation jump in response to the stored signal for the tabulation jump.

5. The method defined in claim 1, 2 or 4 wherein said separate instruction signal is a signal corresponding to a line shift and wherein said method further comprises: actuating a signal corresponding to a line shift; storing the signal corresponding to a line shift in the memory; automatically performing said step of printing upon receipt of said signal corresponding to a line shift; and only thereafter performing said line shift in response to the stored signal for the line shift.

6. The method of claim 1 wherein said step of printing includes moving the carriage so as to print out the characters stored in the memory from right to left.

7. The method of claim 1 wherein said step of moving the carriage relative to the record carrier is performed during the time characters are being fed in by actuation of the keys of the keyboard.

* * * * *